(12) United States Patent
Vasey

(10) Patent No.: US 7,818,304 B2
(45) Date of Patent: Oct. 19, 2010

(54) CONDITIONAL TEXT MANIPULATION

(75) Inventor: Philip E Vasey, London (GB)

(73) Assignee: Business Integrity Limited, London (GB)

( * ) Notice: Subject to any disclaimer, the term of this patent is extended or adjusted under 35 U.S.C. 154(b) by 646 days.

(21) Appl. No.: 11/360,451

(22) Filed: Feb. 23, 2006

(65) Prior Publication Data

US 2006/0190816 A1    Aug. 24, 2006

Related U.S. Application Data

(60) Provisional application No. 60/764,568, filed on Feb. 2, 2006.

(30) Foreign Application Priority Data

Feb. 24, 2005  (GB)  ................................ 0503826.0

(51) Int. Cl.
*G06F 7/00*    (2006.01)
(52) U.S. Cl. ...................................... 707/694; 707/727
(58) Field of Classification Search ........................ None
See application file for complete search history.

(56) References Cited

U.S. PATENT DOCUMENTS

| | | |
|---|---|---|
| 5,097,417 A | 3/1992 | Ukon |
| 6,532,455 B1 * | 3/2003 | Martin et al. .................. 706/47 |
| 7,325,190 B1 * | 1/2008 | Boehmer et al. ............. 715/224 |
| 7,356,760 B2 * | 4/2008 | Jaeger ......................... 715/246 |
| 2003/0023633 A1 | 1/2003 | Ross |
| 2003/0125929 A1 * | 7/2003 | Bergstraesser et al. .......... 704/9 |
| 2003/0194689 A1 * | 10/2003 | Kamasaka et al. ........... 434/350 |
| 2004/0006742 A1 * | 1/2004 | Slocombe .................... 715/513 |
| 2006/0080081 A1 * | 4/2006 | Menninga ...................... 704/4 |
| 2006/0259456 A1 * | 11/2006 | Falk et al. ....................... 707/2 |
| 2007/0239762 A1 * | 10/2007 | Farahbod .................... 707/102 |

FOREIGN PATENT DOCUMENTS

| EP | 1411442 A1 | 4/2004 |
|---|---|---|
| JP | 60-222955 | 11/1985 |

OTHER PUBLICATIONS

GB Search Report for GB0503826.0 Dated Jun. 23, 2006.

* cited by examiner

*Primary Examiner*—Apu M Mofiz
*Assistant Examiner*—Thu Nga Nguyen
(74) *Attorney, Agent, or Firm*—Anderson Gorecki & Manaras LLP

(57) ABSTRACT

A document generation system for generating a customised document using content elements selected by rules operating on input information, the content elements comprising conditional and unconditional text is provided. The system provides means to generate a program structure, containing information about the space characters to be inserted between the conditional and unconditional text in the generated document. The program structure is evaluated to determine the positions of the space characters. The program structure may be an XML structure.

30 Claims, 4 Drawing Sheets

CONDITIONAL TEXT MANIPULATION

RELATED APPLICATIONS

Applicant claims priority to U.S. provisional application no. 60/764,568, filed Feb. 2, 2006. Applicant also claims priority to Great Britain application number 0503826.0 filed on 24 Feb. 2005.

FIELD OF THE INVENTION

The present invention relates to the field of automated document generation, and in particular to the manipulation of conditional text in fully generated and partially generated documents.

BACKGROUND TO THE INVENTION

It is well known to generate customised documents, either manually or using an automated system, from precedents or templates.

If this is done manually, then a printed standard form or other precedent, containing blank spaces for particular relevant information, will be filled in and edited on each specific occasion it is used. Instructions may be included in the standard document to help the user insert the correct or appropriate information.

If this is done using an automated system, then an electronically stored document or template will be used, in conjunction with various logical rules and other criteria, to prompt the user for the correct information and to assemble a customised document by associating various relevant rules with variables within the template. For example, the Hot-Docs™ system, using a library of Form Templates, which store both static and dynamic areas of text, that are initially customised by the user, in conjunction with a questionnaire to produce a completed customised document. Necessary information relevant to the dynamic text areas may either be input directly by a user, or gathered from an Answer File. The Answer File contains information which is repeatedly used in the same or similar customised document. Various logical rules and calculation criteria are used to associate information with the template to produce a final customised document. This document may then be edited, printed or stored.

Other known automated systems include that described in WO01/04772. In this system, a server computer runs a document generation program and is capable of communicating with local or remote client computers over a local area network (LAN) or a wide area network (WAN), such as the internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

Both of these automated methods produce documents in known word processing formats, such as Microsoft Word. These final documents are static. However, the nature of production of the final document means that there are difficulties in ensuring that the result of the manipulation of optional or conditional text is correct.

An example of the problems of text manipulation is considered below. In a parties clause in a contract, information is included regarding the supplier of a particular good or service. The information includes conditional text according to the type of supplier.

There are two types of spaces that may need to be inserted depending upon the conditional text remaining in a generated document, leading spaces and trailing spaces. (In the following examples, the space characters discussed are double underlined for clarity.)

Leading Spaces

Space characters are consistently placed at the start of the conditional texts and at the start of the unconditional text following the final conditional text:

{NAME}[$^{Type\ IS\ 'Registered\ Company'}$(company number {CompanyNumber})][$^{Type\ IS\ 'Registered\ Charity'}$(charity number {CharityNumber})][$^{Type\ IS\ 'Registered\ Company'\ OR\ Type\ IS\ 'Registered\ Charity'}$whose registered office is at {BusinessAddress}][$^{Type\ IS\ 'Individual'}$of {PrivateAddress}]('the supplier')

Trailing Spaces

Space characters are consistently placed at the end of the conditional texts and at the end of the unconditional text that precedes the first conditional text:

{NAME}[$^{Type\ IS\ 'Registered\ Company'}$(company number {CompanyNumber})][$^{Type\ IS\ 'Registered\ Charity'}$(charity number {CharityNumber})][$^{Type\ IS\ 'Registered\ Company'\ OR\ Type\ IS\ 'Registered\ Charity'}$whose registered office is at {BusinessAddress}][$^{Type\ IS\ 'Individual'}$of {PrivateAddress}]('the supplier')

In the above example, the situations of leading spaces and trailing spaces are effectively equivalent, as the same clause text is generated for registered companies:

ABC Software(company number ABC/123)whose registered office at ABC House('the supplier')

for registered charities:

ABC Trust(charity number ABC/123)whose registered office is at ABC House ('the supplier')

and for individuals:

Anthony B. Copeland of Unit 1, ABC House('the supplier').

However, in more complex clauses, the insertion of space characters can easily go wrong. In the situation where both leading and trailing spaces are necessary, space characters are placed consistently at the start and end of conditional and unconditional texts:

{NAME}=[$^{Type\ IS\ 'Registered\ Company'}$(company number {CompanyNumber})][$^{Type\ IS\ 'Registered\ Charity'}$(charity number {Charity Number})][$^{Type\ IS\ 'Registered\ Company'\ OR\ Type\ IS\ 'Registered\ Charity'}$whose registered office is at {BusinessAddress}][$^{Type\ IS\ 'Individual'}$of {PrivateAddress}]('the supplier')

This generates clause text for registered companies with double spacing throughout:

ABC Software(company number ABC/123)whose registered office is at ABC House('the supplier')

A further situation where errors occur is where leading spaces are consistently used with one type of text and trailing spaces consistently used with another. For example, if trailing spaces are used for optional texts connected with company and charity numbers, and leading spaces used for address texts:

{NAME}[*Type IS 'Registered Company'* (company number {CompanyNumbber})][*Type IS 'Registered Charity'* (registered charity number {CharityNumber})][*Type IS 'Registered Company' OR Type IS 'Registered Charity'* whose registered office is at {BusinessAddress}][*Type IS 'Individual'* of {PrivateAddress}]('the supplier')

This generates clause text for registered companies with a double space between the company number and the registered office:

ABC Software(company number ABC/123)whose registered office is at ABC House('the supplier').

Alternatively, leading spaces are used for optional text connected with company and charity numbers and trailing spaces for address texts:

*'Registered Charity'* (registered charity number {CharityNumber})][*Type IS 'Registered Company' OR Type IS 'Registered Charity'* whose registered office is at {BusinessAddress}][*Type IS 'Individual'* of {PrivateAddress}]('the supplier')

This generates clause text for registered companies that has no space between the company number and the registered office:

ABC Software(company number ABC/123)whose registered office is at ABC House('the supplier').

It is necessary to be able to include information contained in or related to conditional text in, both a fully or partially generated document. One particular issue is that in manipulation of conditional text during rule evaluation, the resulting text in the generated document may not be correctly spaced, for example, words may run together or several blank spaces may be inserted between words or phrases.

In existing systems, this problem also occurs, but must be dealt with using complex code which is either hard coded into an individual template, or hand encoded for each document. The main difficulties with hand encoding arise from the fact that the formulation of the space elements is directly related to the conditional text, and therefore requires change whenever the usage conditions change. Consequently, text is produced in a final document that includes more than one adjacent space character or where space characters are excluded between portions of text.

SUMMARY OF INVENTION

The invention aims to address the problems of existing document generation systems by providing a document generation system for generating a customised document using content elements selected by rules operating on input information, the content elements comprising conditional and unconditional text. The system provides means to generate a program structure, containing information about the space characters to be inserted between the conditional and unconditional text in the generated document. The program structure is evaluated to determine the positions of the space characters. Preferably, the program structure is an XML structure.

Embodiments of the invention provide the advantages that the resulting text of the generated document contains the correct number of space characters without the need to hand encode complex rules for space positioning, as the system can evaluate the XML structure regardless of the positions of space characters in the template used to generate the document.

The invention further provides a document generation system for generating a customised document using content elements selected by rules operating on input information, the content elements comprising conditional and unconditional text elements. The system comprises at least one computer having a document generation program installed thereon. The system is capable of generating a fully or a partially customised document by evaluating the rules to select some of the content elements; and wherein the system comprises means adapted to evaluate further rules to determine the position of space characters inserted between the conditional text and unconditional text in the content elements.

The invention also provides a method of manipulating conditional text within a document generation process and a computer program product.

Embodiments of the invention will now be described by way of example only, and with reference to the accompanying drawings in which.

DETAILED DESCRIPTION OF PREFERRED EMBODIMENTS

The system in which embodiments of the present invention are implemented will now be briefly described. The system comprises one or more data processing means, which, where a plurality of processing means are used, are connected together using communication means. For example, client/server architecture may be used, with one of the data processing means functioning as a server, and others as clients. However, a single processing means may function as both server and client Various configurations of client/server architecture are shown in FIGS. 1, 2 and 3.

Figure 1:
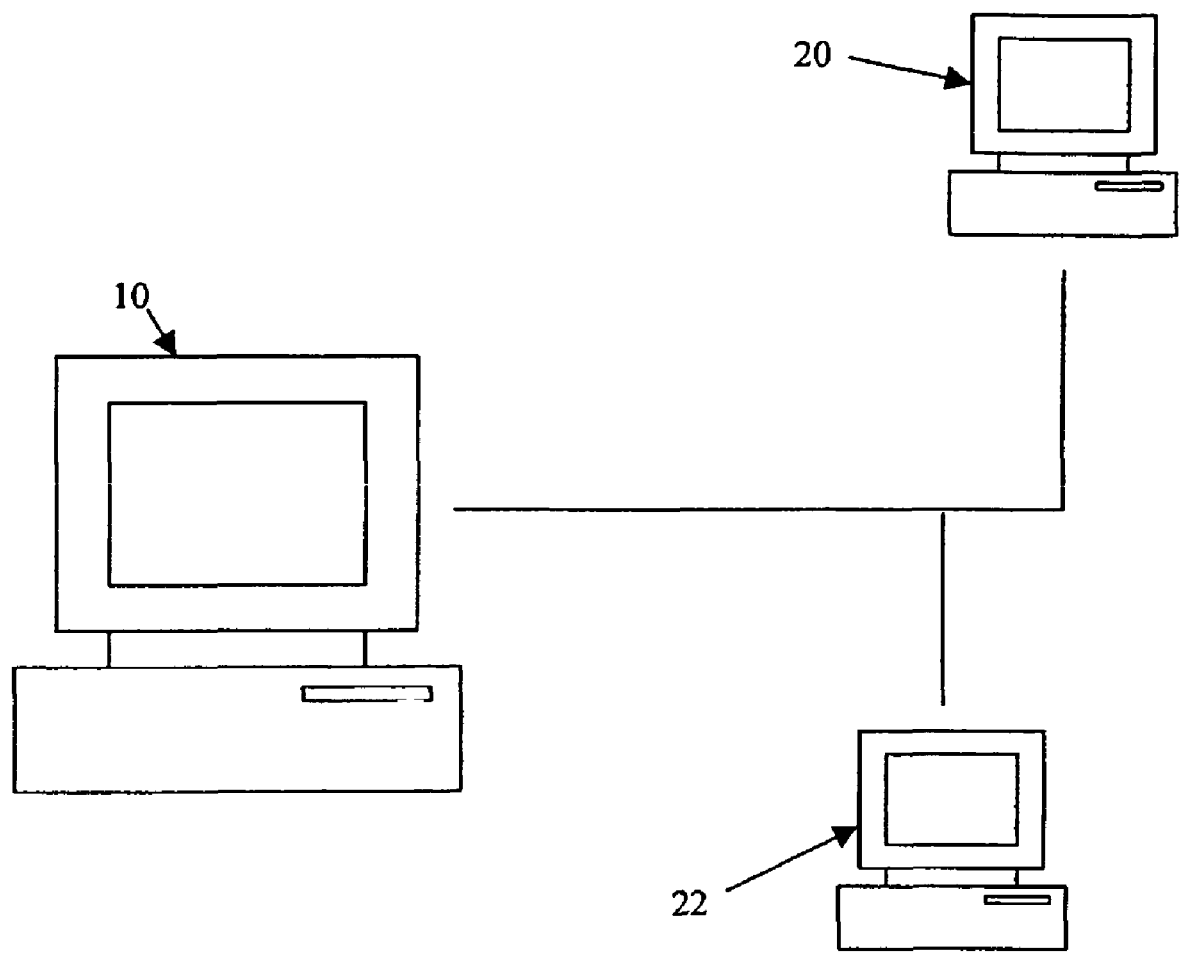
FIG. 1 shows a computer network system suitable for supporting software embodying the present invention.

FIG. 1 shows a server computer 10 connected to two local client computers 20 and 22, connected by means of a local area network (LAN) 30, forming an intranet. Each computer 10, 20, 22, runs an operating system program, such as Microsoft Windows 2000 Professional™ and network programs such as Novell Netware™. The server computer 10 also runs a Web server application such as Microsoft Internet Information Server™, and each of the local client computers 20, 22 also run a browsing application such as Microsoft Internet Explorer. The server 10 and local computers 20, 22 communicate using transmission control protocol/internet protocol (TCP/IP) and hypertext transfer protocol (HTTP). The invention is not limited to any particular hardware, architecture. For example, the invention could be implemented as a stand alone computer such as, for example, a PC.

Figure 2:
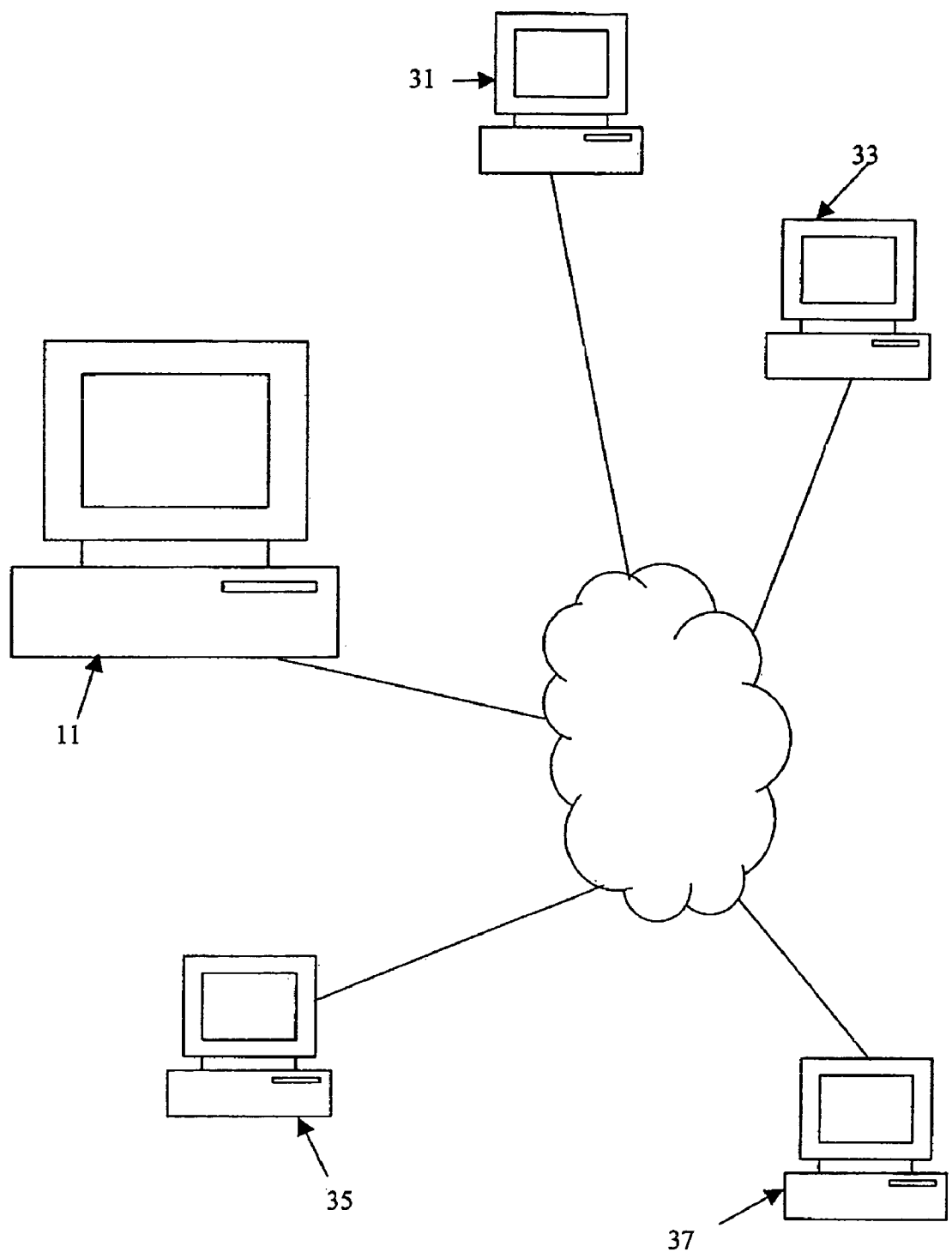
FIG. 2 shows a computer network system suitable for supporting software embodying the present invention.

FIG. 2 shows a single server computer 11 connected to four client computers, 31, 33, 35 and 37, using a LAN, each of which runs the operating systems and browser applications mentioned above, and which communicate with the server computer 10 using TCP/IP and HTTP protocols.

Figure 3:
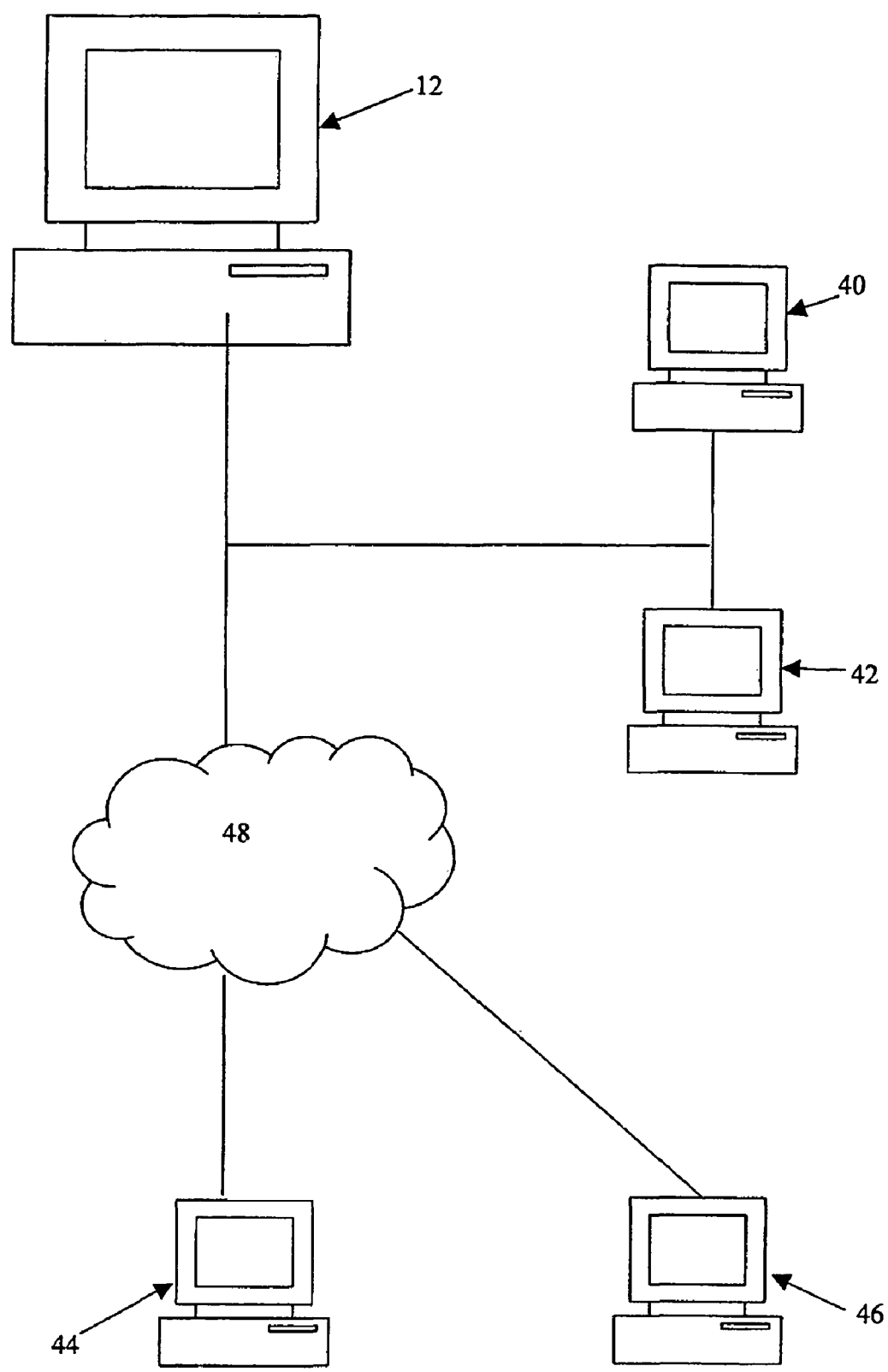
FIG. 3 shows a computer network system suitable for supporting software embodying the present invention.

FIG. 3 shows a server computer 12 connected to two local client computers 40 and 42 using a LAN, and also connected to two remote client computers 44 and 46 through the internet 48. Each runs the operating and browser systems and browser systems mentioned above, and proxy servers and firewalls may be used to protect the intranet from unauthorised access from the internet. Again, communication within the intranet is via TCP/IP and HTTP protocols.

As FIG. 3 is the most general arrangement, embodiments of the invention will be described with respect to such a network.

One or more of the computer systems 12, 40, 42, 44 and 46 runs a word processing application such as Microsoft Word, which is used to create document templates and may be used to view fully or partially customised documents generated by a document generation system. The document template comprises one or more content elements for possible use when generating a customised document and one or more associated rules for determining, on the basis of further information provided by a user, how to use the content elements (which may be conditional clauses or statements) when generating a customised document.

Server computer 12 also runs a document generation program, which, when provided with a template, generates one or more input forms to capture information from a user, the input forms being generated on the basis of rules contained in the template. The document generation program then generates a fully or partially customised documents on the instructions of a user. The document generation program may be run as a server program and is instructed to perform tasks by users of client browser applications.

To generate either a fully or partially customised document from a template, a user instructs the document generation program by sending URL GET or POST request from a client computer, 40, 42, 44 or 46, to the server 12. The document generation program then initiates a session with the client computer. The document generation program may generate one or more Web input forms based on the chosen template, which are passed via a Web server application to the client computer. This Web input form uses standard HTML (hyperlink mark-up language) features such as buttons, free-form entry boxes, tick boxes, pull-down menu list boxes, radio buttons and other graphical user interface (GUI) means for inputting information. The document generation program may generate multiple input forms for distributing to and capturing further information from the users of one or more further client computers 40, 42, 44 46. The document generation program may also produce multiple forms for capturing information from the user of a single client computer in several stages. However, in the following embodiments, it is assumed that only one user of a client computer is involved.

Figure 4:
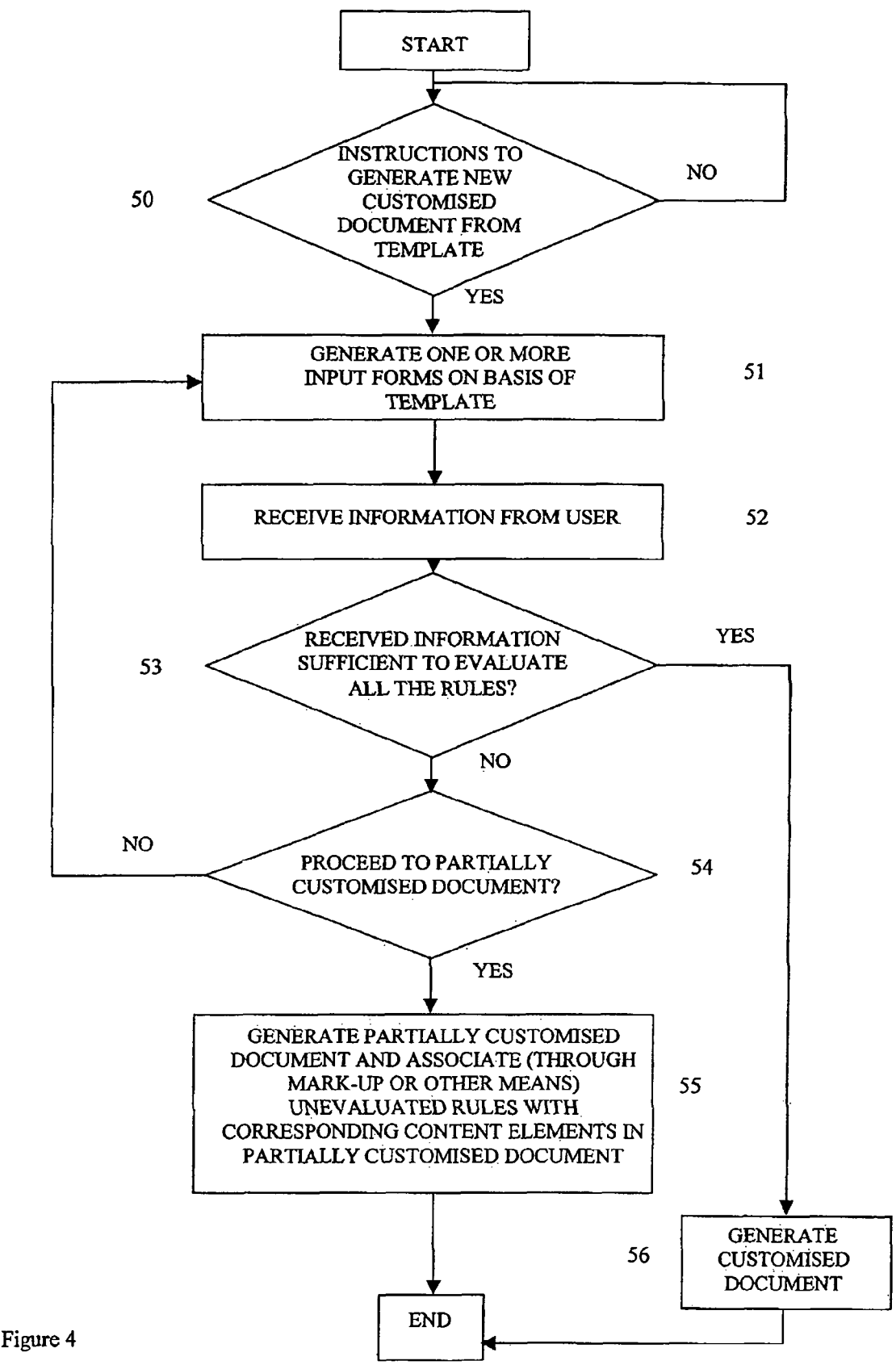
FIG. 4 is a flow chart showing the document generation process.

FIG. 4 is a flow diagram showing the process followed by the document generation program. At step 50, the document generation program waits for an instruction from the user to generate a new customised document from a template. On receiving such an instruction, the document generation program generates, at step 51, a first input form on the basis of the rules contained in the template. The user then enters information, using the input form, which is received by the document generation program at step 52. Then, at step 53, the document generation program determines whether the received information is sufficient to evaluate all the rules. If yes, the process continues to step 56 where the document generation program generates a customised document. If no, then the process continues to step 54, where the document generation program determines whether or not it should proceed to generate a partially customised document. If it should, then the process continues to step 55 where such a document is generated. If there is no request from the user to produce a partially customised document (for example, a tick box on the Web input form has been left blank), then the process returns to step 51, and generates further Web input forms for capturing further information from the user. This process is completed until sufficient information is captured to produce either a fully customised document, or a satisfactory partially customised document.

The customised document contains not only the content elements, the inclusion of which has been determined by the various rules within the template, but also the rules that have not been evaluated. The association between the content elements and rules that have not been evaluated may be represented by means of a mark-up.

For the parties clause considered above, with both leading and trailing spaces within conditional text, the most desirable form of clause is one where it is obvious that all the conditional texts should have a space at the beginning and that any elements that will be replaced by spaced characters during document generation are shown double underlined. Spaces representing single spaces as appearing between text within a sentence not affected by the document generation are shown single underlined.

For example, a generated document for registered companies should contain:

. . . (company number ABC/123) . . .

To enable this, an embodiment of the invention allows the parties clause to be represented by an XML (eXtended Mark-up Language) structure, having encoded space characters, of the form:

```
<PARAGRAPH>
<TEXT><VARIABLE NAME="Name">_</TEXT>
<CONDITIONAL USAGE="Type is 'Registered Company'">
<TEXT>_(company_number_<VARIABLE NAME=
"CompanyNumber")_</TEXT>
</CONDITIONAL>
<CONDITIONAL USAGE="Type is 'Registered Charity'">
<TEXT>_(charity_number_<VARIABLE NAME=
CharityNumber">)_</TEXT>
</CONDITIONAL>
<CONDITIONAL USAGE="Type is 'Registered Company' OR Type
is 'Registered Charity'">
<TEXT>_whose_registered_address_is_at_<VARIABLE
NAME=BusinessAddress">)_</TEXT>
</CONDITIONAL>
<CONDITIONAL USAGE=Type is 'Individual'">
<TEXT>_of_<VARIABLE NAME="PrivateAddress">)_</TEXT>
</CONDITIONAL>
<TEXT>_('the supplier')</TEXT>
</PARAGRAPH>
```

By encoding the conditional and unconditional text in XML, the need to use complex rules to position leading and trailing spaces dependent upon whether text is conditional or unconditional, as discussed above, is avoided.

All of the leading and trailing space characters within <TEXT> elements can be replaced by <SPACE> elements, resulting in an XML structure of the form:

```
<PARAGRAPH>
<TEXT><VARIABLE NAME="Name"></TEXT>
<SPACE>
<CONDITIONAL USAGE="Type is 'Registered Company'">
<SPACE>
<TEXT>(company_number_<VARIABLE NAME=
"CompanyNumber">)</TEXT>
<SPACE>
</CONDITIONAL>
<CONDITIONAL USAGE="Type is 'Registered Charity'">
<SPACE>
<TEXT>(charity_number_<VARIABLE NAME=
"CharityNumber">)</TEXT>
```

-continued

```
<SPACE>
</CONDITIONAL>
<CONDITIONAL USAGE="Type is 'Registered Company' OR Type
is 'Registered Charity'">
<SPACE>
<TEXT>whose_registered_address_is_at_<VARIABLE
NAME="BusinessAddress">)</TEXT>
<SPACE>
</CONDITIONAL>
<CONDITIONAL USAGE="Type is 'Individual'">
<SPACE>
<TEXT>of_<VARIABLE NAME="PrivateAddress">)</TEXT>
<SPACE>
</CONDITIONAL>
<SPACE>
<TEXT>('the supplier')</TEXT>
</PARAGRAPH>
```

When the document is generated, the XML structures are evaluated by removing the complete sub-structure from <CONDITIONAL> elements to </CONDITIONAL> elements when the usage does not hold true, and by removing the <CONDITIONAL> and </CONDITIONAL> elements themselves when the usage statement does hold true.

For example, evaluating the parties XML structure above for registered companies might produce:

```
<PARAGRAPH>
<TEXT>ABC Software</TEXT>
<SPACE>
<SPACE>
<TEXT>(company_number_ABC/123)</TEXT>
<SPACE>
<SPACE>
<TEXT>whose_registered_address_is_at_ABC House</TEXT>
<SPACE>
<SPACE>
<TEXT>('the supplier')</TEXT>
</PARAGRAPH>
```

Contiguous <SPACE> elements are collapsed into a single <SPACE> element:

```
<PARAGRAPH>
<TEXT>ABC Software</TEXT>
<SPACE>
<TEXT>(company_number_ABC/123)<TEXT>
<SPACE>
<TEXT>whose_registered_address_is_at_ABC House</TEXT>
<SPACE>
<TEXT>('the supplier')</TEXT>
</PARAGRAPH>
```

Resulting in the following properly spaced clause appearing in a generated document:

ABC Software(company number ABC/123) whose
      registered office is at ABC House('the supplier').

The XML structure is provided by encoding means included in the document generation system. The means may be integral with the generation program or stored in a separate location and accessible by the generation program.

Although the examples given above show the use of <SPACE> elements to provide single spaces between portions of text, any number of spaces can be inserted, provided the XML structure reflects the positioning of the <SPACE> elements appropriately.

The document generation system is therefore able to produce a partially customised document in which conditional and unconditional text, as well as space elements and space characters are represented in the form of a mark up. The system evaluates a set of rules associated with the mark up to determine the eventual spacing of space characters within conditional and unconditional text in a fully customised document.

Various modifications to the embodiments of the invention described above, falling within the scope of the appended claims, will be apparent to those skilled in the art.

What is claimed is:

1. A document generation system for generating a customised document using content elements selected by rules operating on input information, the content elements comprising conditional and unconditional text elements, the system comprising:

at least one computer having a document generation program installed thereon; wherein the system is capable of generating a fully or a partially customised document by evaluating the rules to select some of the content elements; and means adapted to generate a program structure representing the conditional text elements including space elements representing space characters, the evaluation of which determines the position of space characters inserted between the conditional text and unconditional text of the content elements.

2. The document generation system of claim 1, comprising means to evaluate the program structure.

3. The document generation system of claim 2, wherein the means to evaluate the program structure is integral with the document generation program.

4. The document generation system of claim 2, wherein the means to evaluate the program structure is accessible by the document generation program.

5. The document generation system of claim 1, wherein the program structure is an XML structure.

6. The document generation system of claim 1, wherein the at least one computer is part of a client server network, comprising at least one client computer and at least one server computer.

7. The document generation system of claim 6, wherein the at least one client computer and the at least one server computer communicate using a communication protocol.

8. The document generation system of claim 7, wherein the communication protocol is at least one of TCP/IP, HTTP or XML.

9. The document generation system of claim 6, wherein the at least one computer is a server computer.

10. The document generation system of claim 6, wherein the at least one computer is a client computer.

11. The document generation system of claim 9, wherein the means adapted to generate the program structure is stored on the server computer.

12. The document generation system of claim 10, wherein the means adapted to generate the program structure is stored on a client computer.

13. The document generation system of claim 1, comprising means to evaluate further rules associated with the program structure.

14. The document generation system of claim 13, wherein the means to evaluate the further rules evaluates the program structure.

15. The document generation system of claim 14, wherein evaluation of the further rules collapses contiguous space elements to a single space element.

16. The document generation system of claim 15, wherein the single space element represents a single-space character.

17. A computer program product, comprising a computer usable medium having a computer readable program code embodied therein, said computer readable program code adapted to be executed to implement a method of manipulating conditional text in a document generation system, said method comprising:
receiving input information;
selecting content elements, the content elements containing conditional and unconditional text, in a template, using rules operating on the input information;
generating a program structure containing information about space characters to be inserted between the conditional text and unconditional text in the content elements;
evaluating the program structure; and
generating a document containing the selected content elements and inserted space characters.

18. The computer program product of claim 17, wherein the program structure is an XML structure.

19. A computer program product, having computer code stored thereon which when run on a computer causes the computer to perform the steps of:
receiving input information;
selecting content elements, the content elements containing conditional and unconditional text, in a template, using rules operating on the input information;
generating a program structure containing information about space characters to be inserted between the conditional text and unconditional text in the content elements;
evaluating the program structure; and
generating a document containing the selected content elements and inserted space characters.

20. A document generation system for generating a customised document using content elements selected by rules operating on input information, the content elements comprising conditional and unconditional text elements, the system comprising:
at least one computer having a document generation program installed thereon; wherein the system is capable of generating a fully or a partially customised document by evaluating the rules to select some of the content elements; and
means adapted to evaluate further rules to determine the position of space characters inserted between the conditional text and unconditional text in the content elements.

21. The document generation system of claim 20, wherein when the system generates a partially customised document, conditional text is represented by means of a mark up.

22. The document generation system of claim 21, wherein the mark up contains space elements representing space characters between conditional and unconditional text in the content elements.

23. The document generation system of claim 22, wherein when the document generation system generates a fully customised document, the further rules are evaluated to replace contiguous space elements with space characters.

24. The document generation system of claim 20 wherein the at least one computer is part of a client server network, comprising at least one client computer and at least one server computer.

25. The document generation system of claim 24, wherein the at least one client computer and the at least one server computer communicate using a communication protocol.

26. The document generation system of claim 25, wherein the communication protocol is at least one of TCP/IP, HTTP or XML.

27. The document generation system of claim 24, wherein the at least one computer is a server computer.

28. The document generation system of claim 24, wherein the at least one computer is a client computer.

29. The document generation system of claim 27, wherein the means adapted to generate the program structure is stored on the server computer.

30. The document generation system of claim 28, wherein the means adapted to generate the program structure is stored on a client computer.

* * * * *